US012455392B2

(12) United States Patent
Albabli et al.

(10) Patent No.: US 12,455,392 B2
(45) Date of Patent: Oct. 28, 2025

(54) METHOD TO CORRECT VSP DATA

(71) Applicant: SAUDI ARABIAN OIL COMPANY, Dhahran (SA)

(72) Inventors: Mohammed Ibrahim Albabli, Qatif (SA); Hussain Alnasser, Safwa (SA); Hamad Alswaidan, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 497 days.

(21) Appl. No.: 17/817,938

(22) Filed: Aug. 5, 2022

(65) Prior Publication Data

US 2024/0045092 A1 Feb. 8, 2024

(51) Int. Cl.
*G01V 1/30* (2006.01)
*G06N 3/08* (2023.01)

(52) U.S. Cl.
CPC .............. *G01V 1/303* (2013.01); *G01V 1/301* (2013.01); *G06N 3/08* (2013.01); *E21B 2200/22* (2020.05);
(Continued)

(58) Field of Classification Search
CPC .... E21B 2200/22; G01V 1/282; G01V 1/301; G01V 1/303; G01V 1/306;
(Continued)

(56) References Cited

U.S. PATENT DOCUMENTS

| 6,807,489 B2 | 10/2004 | Naville et al. |
| 7,088,639 B2 | 8/2006 | Walls et al. |

(Continued)

FOREIGN PATENT DOCUMENTS

| CA | 3107816 A1 | 10/2021 |
| CN | 104977618 A | 10/2015 |

(Continued)

OTHER PUBLICATIONS

Zhao, Yuxing et al., "Distributed Acoustic Sensing Vertical Seismic Profile Data Denoiser Based on Convolutional Neural Network"; IEEE Transactions on Geoscience and Remote Sensing; vol. 60, Article No. 5900511; 2022 (11 pages).

(Continued)

*Primary Examiner* — Lisa M Caputo
*Assistant Examiner* — Joshua L Forristall
(74) *Attorney, Agent, or Firm* — Osha Bergman Watanabe & Burton LLP

(57) ABSTRACT

Systems and methods are disclosed. The method includes obtaining vertical seismic profiling (VSP) data and surface seismic (SS) data for a subterranean region of interest. The VSP data includes a corrupt section and a valid section. The method further includes determining a VSP attribute and a VSP spectrum using the VSP data, determining an SS attribute using the SS data, and determining a corrected VSP attribute for the corrupt section. The method still further includes training a neural network using the VSP attribute, the SS attribute, and the VSP spectrum for the valid section, predicting a corrected VSP spectrum for the corrupt section by inputting the corrected VSP attribute and the SS attribute for the corrupt section into the trained neural network, and determining corrected VSP data for the corrupt section using the corrected VSP attribute and the corrected VSP spectrum.

18 Claims, 12 Drawing Sheets

(52) U.S. Cl.
CPC ............... *G01V 2210/1295* (2013.01); *G01V 2210/1425* (2013.01); *G01V 2210/622* (2013.01); *G01V 2210/64* (2013.01)

(58) Field of Classification Search
CPC ... G01V 2210/1295; G01V 2210/1425; G01V 2210/161; G01V 2210/614; G01V 2210/622; G01V 2210/6222; G01V 2210/64; G06N 3/0464; G06N 3/08; G06N 3/084; G06N 3/048
USPC .......................................................... 702/14
See application file for complete search history.

(56) References Cited

U.S. PATENT DOCUMENTS

| | | | |
|---|---|---|---|
| 2004/0122596 A1 | 6/2004 | Sudhakar et al. | |
| 2015/0109885 A1* | 4/2015 | Nowak | G01V 1/40 367/25 |
| 2016/0178772 A1* | 6/2016 | Carter | G01V 1/36 702/17 |
| 2020/0018149 A1 | 1/2020 | Luo et al. | |
| 2021/0247534 A1 | 8/2021 | Bo | |
| 2023/0152480 A1* | 5/2023 | Singh | G01V 1/364 702/17 |
| 2024/0084689 A1* | 3/2024 | Shrivastava | E21B 47/04 |

FOREIGN PATENT DOCUMENTS

| | | |
|---|---|---|
| CN | 112147699 A | 12/2020 |
| CN | 113514881 A | 10/2021 |
| CN | 113935467 A | 1/2022 |
| WO | 2014191427 A2 | 12/2014 |

OTHER PUBLICATIONS

Jia, Zhuang et al., "A Deep CNN Model for Ringing Effect Attenuation of Vibroseis Data"; Proceedings of the 2018 International Conference of Exploration Geophysics (CEG); pp. 1-4; Jul. 2018 (4 pages).

Hauge, Paul S., "Measurements of attenuation from vertical seismic profiles"; Geophysics; vol. 46, Issue 11; pp. 1548-1558; Nov. 1981 (11 pages).

International Search Report issued in International Application No. PCT/US2023/029422 dated Nov. 9, 2023 (5 pages).

Written Opinion issued in International Application No. PCT/US2023/029422 dated Nov. 9, 2023 (9 pages).

* cited by examiner

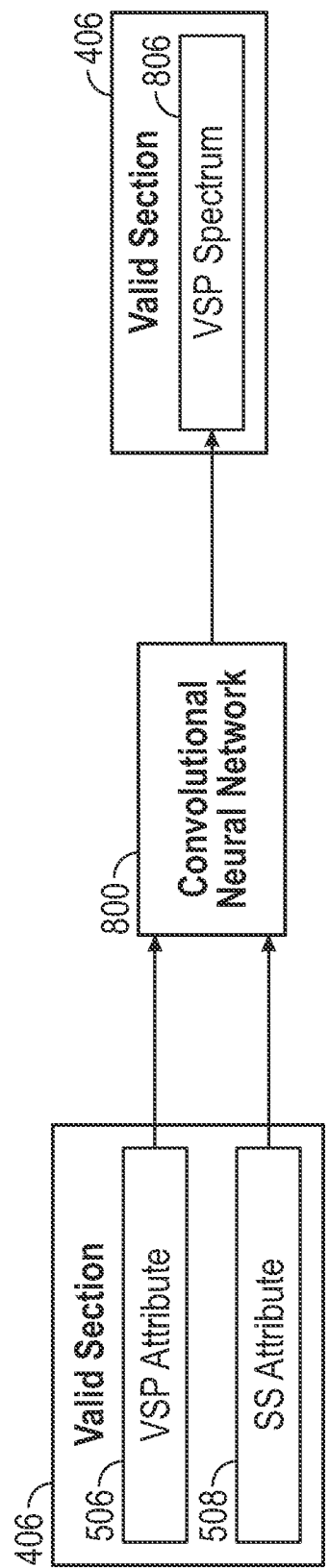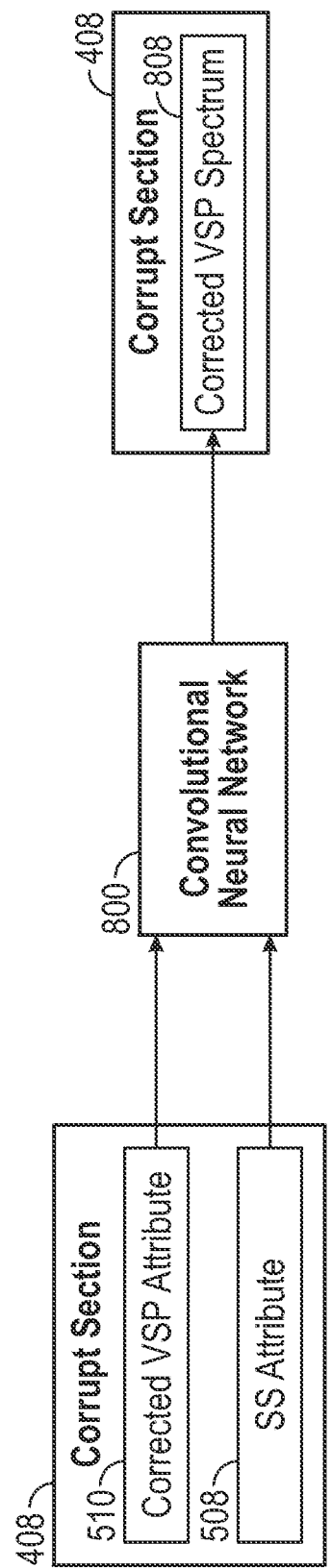

METHOD TO CORRECT VSP DATA

BACKGROUND

Vertical seismic profiling (VSP) may be performed near a well. However, VSP data may present noisy, corrupt, anomalous, and/or missing data. These situations may render some of the VSP data invalid and unsuitable for use. Noisy, corrupt, anomalous, and/or missing VSP data may be collected due to poor cementation between casing and the well wall, seismic receivers having limited access to depths within the well, and/or VSP acquisition system failure. Following correction of the noisy, corrupt, anomalous, and/or missing VSP data, the VSP data may be used to convert surface seismic (SS) data from a time domain to a depth domain. The depth-domain SS data may be used to further characterize the subterranean region surrounding the well and the hydrocarbon reservoir the well penetrates.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method. The method includes obtaining vertical seismic profiling (VSP) data and surface seismic (SS) data for a subterranean region of interest. The VSP data includes a corrupt section and a valid section. The method further includes determining a VSP attribute and a VSP spectrum using the VSP data for the valid section, determining an SS attribute using the SS data for the corrupt section and the valid section, and determining a corrected VSP attribute for the corrupt section using the VSP attribute and the SS attribute for the valid section. The method still further includes training a neural network using the VSP attribute, the SS attribute, and the VSP spectrum for the valid section, predicting a corrected VSP spectrum for the corrupt section by inputting the corrected VSP attribute and the SS attribute for the corrupt section into the trained neural network, and determining corrected VSP data for the corrupt section using the corrected VSP attribute and the corrected VSP spectrum.

In general, in one aspect, embodiments relate to a system. The system includes a vertical seismic profiling (VSP) acquisition system for obtaining VSP data and a surface seismic (SS) acquisition system for obtaining SS data. The system further includes a seismic processing system configured to receive the VSP data and the SS data for a subterranean region of interest. The VSP data includes a corrupt section and a valid section. The seismic processing system is further configured to determine a VSP attribute and a VSP spectrum using the VSP data for the valid section, determine an SS attribute using the SS data for the corrupt section and the valid section, and determine a corrected VSP attribute for the corrupt section using the VSP attribute and the SS attribute for the valid section. The system still further includes a computer processor configured to train a neural network using the VSP attribute, the SS attribute, and the VSP spectrum for the valid section, predict a corrected VSP spectrum for the corrupt section by inputting the corrected VSP attribute and the SS attribute for the corrupt section into the trained neural network, and determine corrected VSP data for the corrupt section using the corrected VSP attribute and the corrected VSP spectrum.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

FIG. 7B illustrates convolution with zero padding in accordance with one or more embodiments.

FIG. 7C illustrates pooling in accordance with one or more embodiments.

FIG. 8A shows a workflow in accordance with one or more embodiments.

FIG. 8B shows a workflow in accordance with one or more embodiments.

DETAILED DESCRIPTION

Figure 1:
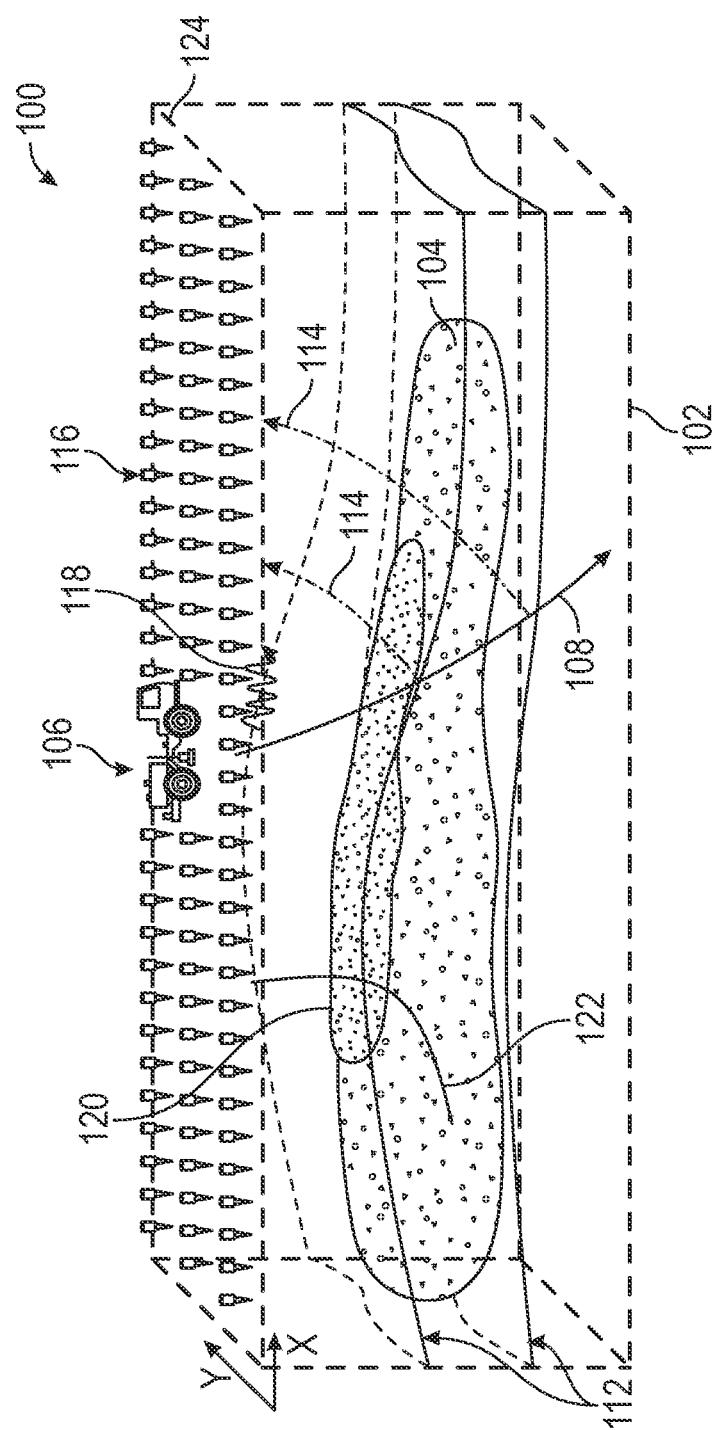
FIG. 1 depicts a surface seismic survey in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "a seismic trace" includes reference to one or more of such traces.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowchart may be omitted, repeated, and/or performed in a different order than the order shown. Accordingly, the scope disclosed herein should not be considered limited to the specific arrangement of steps shown in the flowchart.

Although multiple dependent claims are not introduced, it would be apparent to one of ordinary skill that the subject matter of the dependent claims of one or more embodiments may be combined with other dependent claims.

In the following description of FIGS. 1-12, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

Vertical seismic profiling (VSP) data may be used to convert surface seismic (SS) data from a time domain to a depth domain. However, VSP data may be noisy, corrupt, anomalous, and/or missing in certain sections. Using these sections for time-to-depth domain conversion may render manifestations of subterranean features in the depth-domain SS data in the incorrect locations. This disclosure presents a method and systems to correct the noisy, corrupt, anomalous, and/or missing sections of VSP data.

FIG. 1 depicts a surface seismic (SS) survey (100) of a subterranean region of interest (102), which may contain a gas deposit (120) within a hydrocarbon reservoir (104). The SS survey (100) may use a SS acquisition system to generate and record SS data. The SS acquisition system may include one or more seismic sources (106) and multiple seismic receivers (116). The seismic source (106) generates radiated seismic waves (108). In a land environment, the seismic source (106) may be a dynamite source or one or more seismic vibrators ("vibroseis truck"). In a marine or lacustrine environment, the seismic source (106) may be an air gun. The radiated seismic waves (108) from a single activation of the seismic source (106) may be recorded by tens or hundreds of thousands of seismic receivers (116). In a land environment, the seismic receivers (116) may record the velocity or acceleration of ground motion caused by the radiated seismic waves (108). In a marine or lacustrine environment, the seismic receivers (116) may record pressure fluctuations caused by the radiated seismic waves (108).

Each radiated seismic wave (108) may propagate along a variety of paths. First, a radiated seismic wave (108) may propagate along the surface of the earth (124) as surface waves or direct waves ("ground-roll") (118). Second, a radiated seismic wave (108) may propagate into the subterranean region of interest (102), refract at one or more geological discontinuities (112), and not return to the surface of the earth (124). Third, a radiated seismic wave (108) may propagate into the subterranean region of interest (102), reflect at one or more geological discontinuities (112), and return to the surface of the earth (124) as reflected seismic waves (114). Fourth, a radiated seismic wave (108) may propagate into the subterranean region of interest (102), refract and reflect at one or more geological discontinuities (112), and return to the surface of the earth (124) as reflected seismic waves (114). A person of ordinary skill in the art will appreciate that each radiated seismic wave (108) may take still other paths.

Reflected seismic waves (114) generated by a single activation of the seismic source (106) may be recorded by each seismic receiver (116) as a two-way time series. This two-way time series denotes a "seismic trace." Further, "two-way time" may denote the time it takes for a radiated seismic wave (108) to travel two ways or two directions. For example, a radiated seismic wave (108) may emit from a seismic source (106), travel towards the center of the earth (one-way travel), reflect at a geological discontinuity (112), and travel towards the surface of the earth (124; two-way travel).

The seismic source (106) is positioned at a location denoted $(x_s, y_s)$ where x and y represent orthogonal axes on the surface of the earth (124) above the subterranean region of interest (102). The seismic receivers (116) are positioned at various seismic receiver locations denoted $(x_r, y_r)$. Thus, radiated seismic waves (108) generated by a single activation of the seismic source (106) may be represented as five-dimensional SS data, D $(x_s, y_s, x_r, y_r, t)$, where t delimits the time when the amplitude of ground motion was measured by each seismic receiver (116). The SS data described here is only one type of SS data. Other types of SS data may include gravity data, active source resistivity data, magnetotelluric data, or any combination of these data.

The SS data may present multiple seismic wave types. Seismic wave types may include compressional waves (hereinafter "P-waves"), shear waves (hereinafter "S-waves"), Rayleigh waves, and Love waves. Further, each seismic wave type within the SS data may have traveled in multiple ways or directions. For example, P-waves and S-waves may have traveled towards the center of the earth and towards the surface of the earth (124).

Subterranean features such as geological discontinuities (112) may manifest within SS data. Further, certain geological discontinuities (112) may be interpreted as indicative of the existence of a hydrocarbon reservoir (104). For example, the apex of an anticline within the subterranean region of interest (102) may trap hydrocarbons. Thus, the manifestation of an anticline within SS data may be interpreted as an indicator that a hydrocarbon reservoir (104) exists within the subterranean region of interest (102).

If the manifestation of a geological discontinuity (112) indicative of a hydrocarbon reservoir (104) presents within SS data, a well (122) may be drilled within the subterranean region of interest (102) to access and produce hydrocarbons from the hydrocarbon reservoir (104) to the surface of the earth (124).

Figure 2:
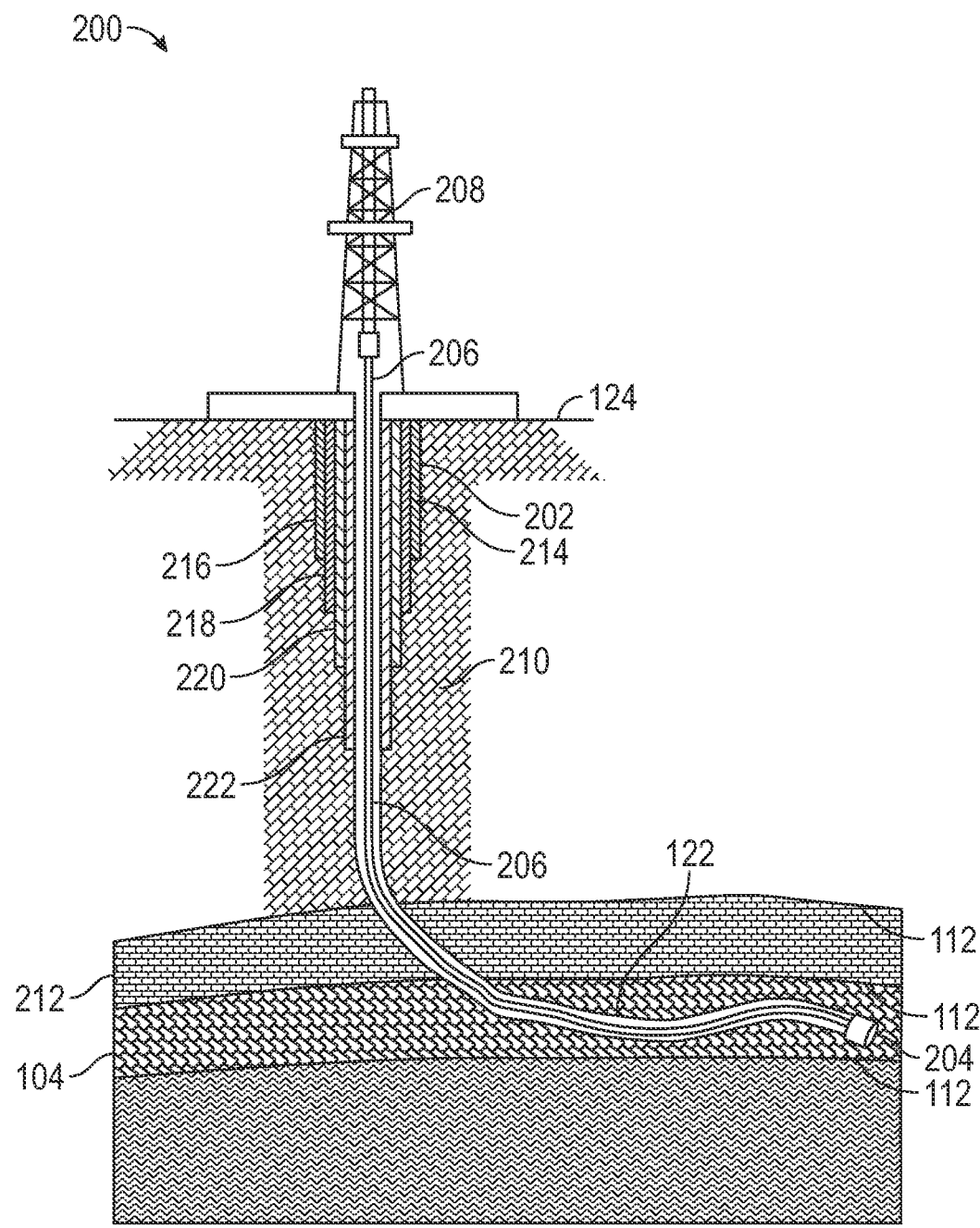
FIG. 2 illustrates a drilling system in accordance with one or more embodiments.

FIG. 2 illustrates a drilling system (200), in accordance with one or more embodiments. A well (122) may be drilled using a drill bit (204) attached to a drillstring (206) further attached to a drill rig (208) located on the surface of the earth (124). The well (122) may traverse a plurality of overburden layers (210), one or more cap-rock layers (212), and geological discontinuities (112) to reach a hydrocarbon reservoir (104).

During drilling of a well (122), casing strings and casing liners may be lowered into the well (122) and cemented to the well wall (202) within an annulus (214). Casing strings and casing liners are composed of casing joints and couplings threaded together, where each casing joint is a steel pipe approximately 40 feet long. A casing string is a suitable length for a specific well (122) such that the casing string extends to the top of the well (122) on the surface of the earth (124). Alternatively, casing liners are anchored from inside the adjacent casing liner or casing string closest to the surface of the earth (124) and do not extend to the top of the well (122). FIG. 2 illustrates a conductor casing string (216), a surface casing string (218), an intermediate casing string (220), and a production casing string (222). Casing liners are not shown. Hereinafter casing strings and casing liners will be referred to as simply "casing."

Once casing is installed within a well (122), casing may provide well strength and stability such that neighboring overburden layers (210) and cap-rock layers (212) do not cave into the well (122) and wellhead tools may be installed on the surface of the earth (124). Further, casing may isolate one overburden layer (210) from a neighboring overburden layer (210) or cap-rock layer (212) and/or may isolate an overburden layer (210) from the well (122). Further still, casing may aid in the control of pressure and fluid flow within the well (122) during the production of hydrocarbons from the hydrocarbon reservoir (104) and during the injection of water and/or gas into the hydrocarbon reservoir (104).

Figure 3:
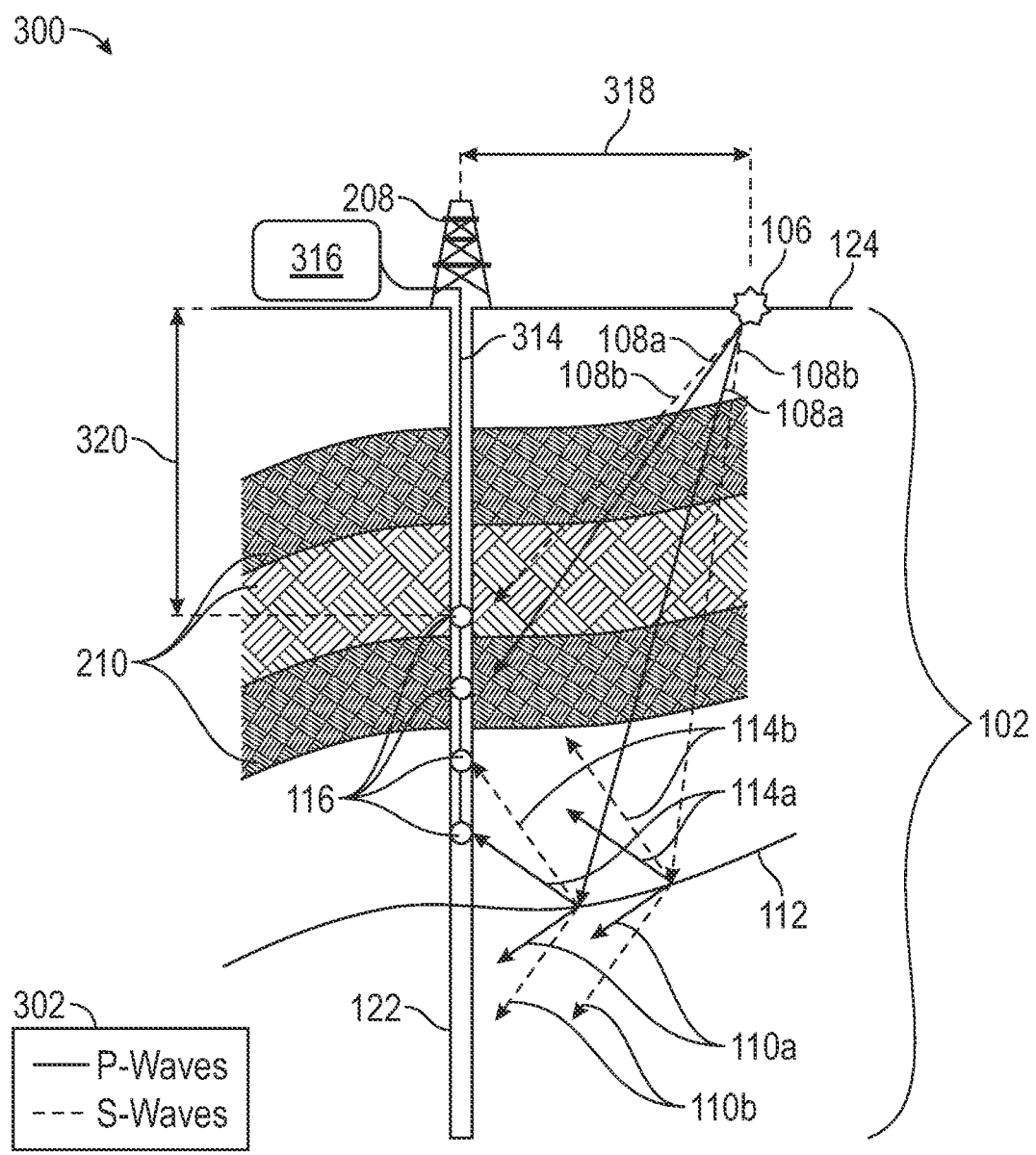
FIG. 3 depicts a vertical seismic profiling survey in accordance with one or more embodiments.

A vertical seismic profiling (VSP) survey may be performed during or following the drilling of a well (122). FIG. 3 depicts a VSP survey (300) in accordance with one or more embodiments. A VSP survey (300) may use a VSP acquisition system to generate and record VSP data. The VSP acquisition system may include one or more seismic sources (106) and multiple seismic receivers (116). Each VSP acquisition system may be designed for one or more seismic source-seismic receiver configurations. Configurations may include zero-offset VSP, offset VSP, walkaway VSP, walk-above VSP, and seismic-while-drilling VSP. Zero-offset VSP may use one or more stationary or static seismic sources (106) located near the drill rig (208) on the surface of the earth (124) and multiple dynamic seismic receivers (116) located within the well (122) (i.e., downhole). Offset VSP may use one or more static seismic sources (106) located some distance (318) away from the drill rig (208) on the surface of the earth (124) and multiple dynamic seismic receivers (116) downhole. Walkaway VSP may use one or more dynamic seismic sources (106) located on the surface of the earth (124) and multiple static seismic receivers (116) downhole. Walk-above VSP may use multiple static seismic sources (106) located on the surface of the earth (124) and multiple static seismic receivers (116) downhole. In this configuration, the seismic sources (106) are often directly above the seismic receivers (116) in a deviated well (not shown). Seismic-while-drilling VSP may use the dynamic drill bit (204) as the seismic source (106) downhole with multiple static seismic receivers (116) on the surface of the earth (124). Thus, FIG. 3 may depict numerous types of VSP surveys (300) such as offset VSP or walkaway VSP. Hereinafter, "VSP data" may be data collected using any VSP configuration.

In FIG. 3, the seismic receivers (116) are suspended from the drill rig (208) using a means of conveyance (314). The means of conveyance (314) may be a wireline cable, fiber optic cable, coil tubing, drill pipe, wired drill pipe, or any other conveyance (314) known to a person of ordinary skill in the art. The means of conveyance (314) provides mechanical support for the seismic receivers (116) in the well (122). Further, the means of conveyance (314) may provide electrical power to the seismic receivers (116), transmit data recorded by the seismic receivers (116) to a recording facility (316) on the surface of the earth (124), or both. In land operations, the recording facility (316) may be mounted within a truck. In sea operations, the recording facility (316) may be part of the drill rig (208), production platform, or ship.

Continuing with FIG. 3, the seismic source (106) generates radiated seismic waves (108*a-b*) each of which may propagate along a variety of paths. First, a radiated seismic wave (108*a-b*) may propagate directly through the subterranean region of interest (102). Second, a radiated seismic wave (108*a-b*) may propagate through the subterranean region of interest (102) and reflect at one or more geological discontinuities (112) as reflected seismic waves (114*a-b*). Third, a radiated seismic wave (108*a-b*) may propagate through the subterranean region of interest (102) and refract at one or more geological discontinuities (112) as refracted seismic waves (110*a-b*). Some radiated seismic waves (108*a-b*), reflected seismic waves (114*a-b*), and refracted seismic waves (110*a-b*) may be P-waves (108*a*, 114*a*, and 110*a*) and others may be S-waves (108*b*, 114*b*, and 110*b*) as shown by the key (302). Further, refracted or reflected S-waves may produce both S-waves and P-waves. Further still, refracted or reflected P-waves may produce both P-waves and S-waves.

Continuing still with FIG. 3, each seismic receiver (116) may detect and record the vibrations caused by radiated seismic waves (108*a-b*), reflected seismic waves (114*a-b*), and refracted seismic waves (110*a-b*) as seismic traces. The collection of seismic traces is denoted "VSP data." Each pre-defined time sample within each seismic trace records the amplitude of the vibration caused by the radiated seismic waves (108*a-b*), reflected seismic waves (114*a-b*), and refracted seismic waves (110*a-b*). The amplitudes may be positive or negative at various times along each seismic trace.

As previously described, SS data and VSP data may present multiple seismic wave types, such as P-waves and S-waves, and multiple seismic wave directions, such as towards the center of the earth and towards the surface of the earth (124). Wavefield separation methods may be used to separate SS data and VSP data by seismic wave type and/or seismic wave direction. For example, wavefield separation methods may be used to separate SS data such that the SS data only presents P-waves directed towards the center of the earth. Further, wavefield separation methods may be used to separate VSP data such that the VSP data only presents P-waves. Wavefield separation methods include, but are not limited to, first break picking, median filtering, mean filtering, eigenvector filtering, masking filtering, Radon transform methods, or any combination of these methods. Further, wavefield separation methods may be performed in, but not limited to, the time-depth domain, frequency-wavenumber domain, and time-slowness domain.

For example, first breaking picking may separate VSP data by seismic wave type by exploiting the concept that, in general, P-waves travel faster than S-waves. Thus, at any seismic receiver depth (320), P-waves arrive before S-waves. First break picking may be performed manually, automatically, or semi-automatically. A person of ordinary skill will appreciate the numerous first break picking methods available such as interpolation algorithms, machine learning methods, the modified energy ratio (MER) method, and Coppens' method.

Figure 4:
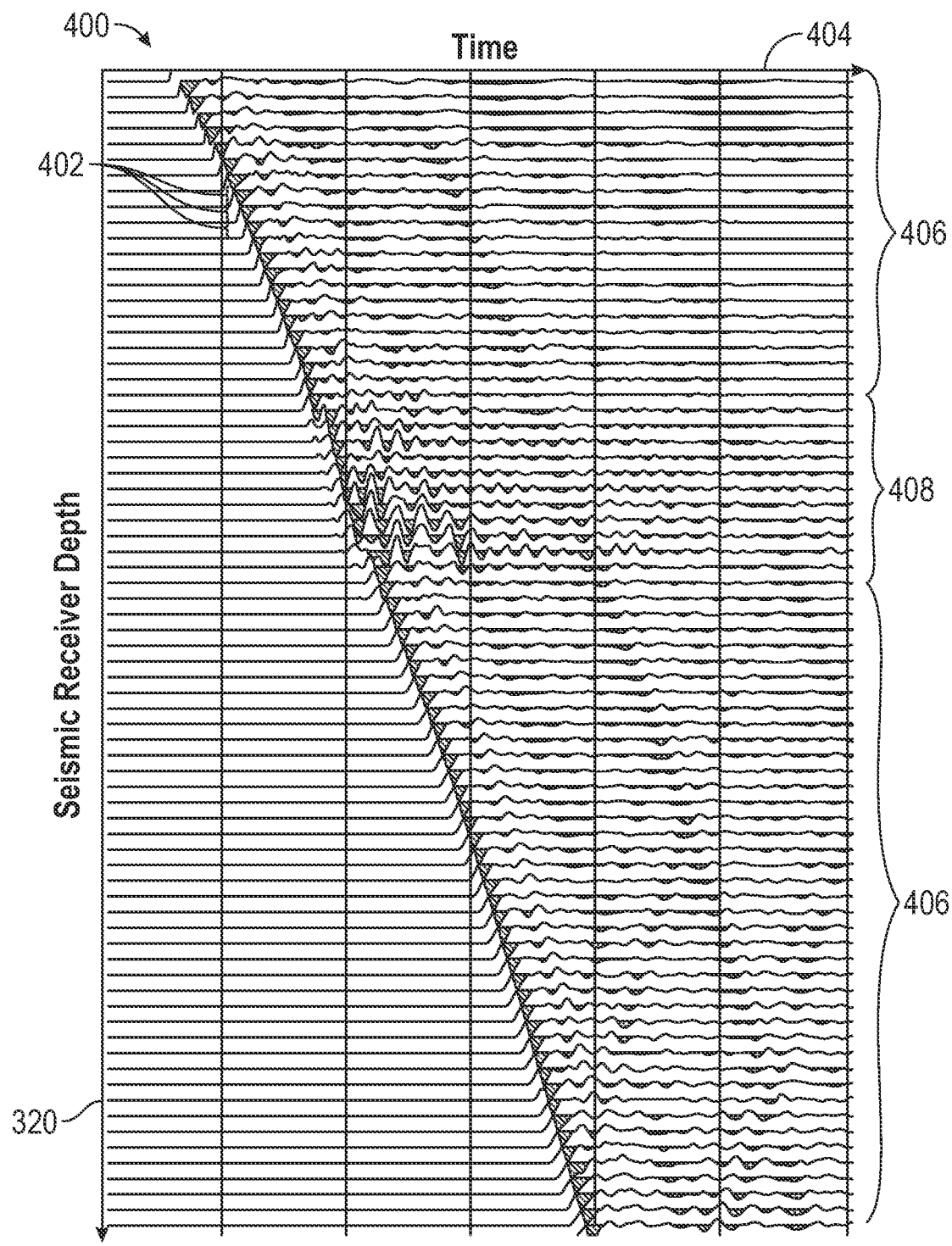
FIG. 4 shows vertical seismic profiling data in accordance with one or more embodiments.

FIG. 4 displays VSP data (400) following first break picking in accordance with one or more embodiments. Each seismic trace (402) is displayed horizontally relative to arrival time (404) (hereinafter also "time") at a seismic receiver (116), seismic receiver depth (320), and amplitude of vibration. Time (404) presents on the abscissa and seismic receiver depth (320) presents on the ordinate. Amplitudes oriented downward present positive amplitudes. Amplitudes oriented upward present negative amplitudes.

The VSP data (400) presented in FIG. 4 contains noisy, corrupt, anomalous, and/or missing data. Hereinafter, the term "artifact" includes noisy, corrupt, anomalous, and/or missing seismic traces (402) within the VSP data (400). Seismic traces (402) that present artifacts may be separated from seismic traces (402) that present little-to-no artifacts. A section of seismic traces (402) that present artifacts is denoted a corrupt section (408). A section of seismic traces (402) that present little-to-no artifacts is denoted a valid section (406). The VSP data (400) may present one or more corrupt sections (408) and one or more valid sections (406).

Artifacts may manifest in VSP data (400) for a variety of reasons. In some cases, noisy seismic traces (402) may manifest due to poor cementation between the casing, such as the production casing string (222), and the well wall (202). Poor cementation may cause the casing to vibrate during the collection of VSP data (400). In other cases, seismic traces (402) may be missing due to seismic receivers (116) downhole being unable to access a depth along the well (122) or due to intermittent VSP acquisition system failure. A person of ordinary skill in the art will appreciate that other reasons may cause artifacts in VSP data (400).

Artifacts within a corrupt section (408) of VSP data (400) may alter VSP attributes. Attributes may be any measurable property of VSP data and/or SS data. Attribute types may include, but are not limited to, time, depth, velocity, attenuation, amplitude, frequency, phase, and polarity for each pre-defined time sample of each seismic trace (402) within the VSP data (400) and/or the SS data. Further, two or more attributes may be determined relative to one another as a spectrum. For example, an amplitude spectrum may present amplitude relative to frequency. Further, a phase spectrum may present phase relative to frequency.

Figure 5:
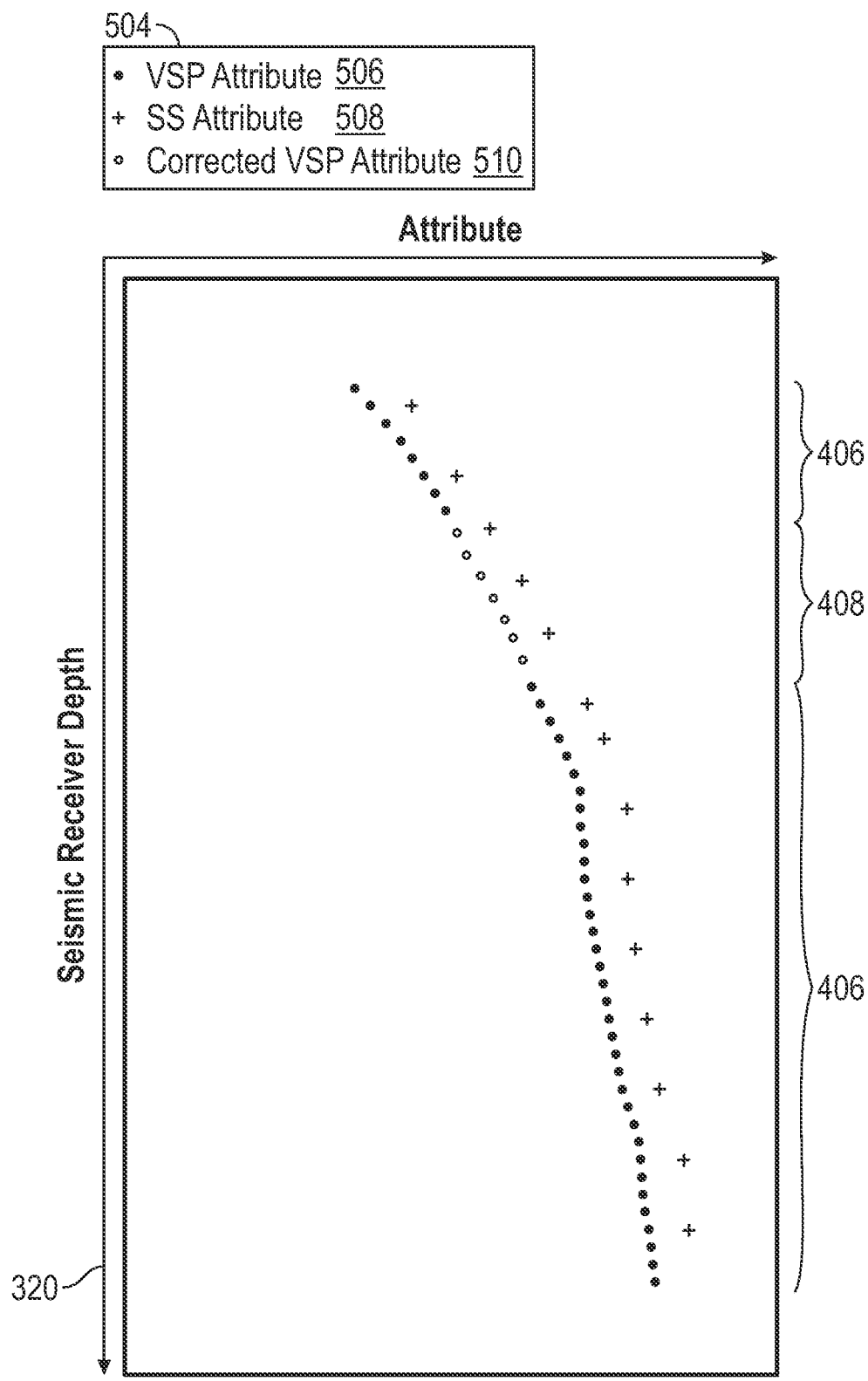
FIG. 5 displays an attribute in accordance with one or more embodiments.

Some VSP attributes in a corrupt section (408) may be corrected. For example, assume FIG. 5 presents a VSP attribute (506) for two valid sections (406) and an SS attribute (508) for the two valid sections (406) and one corrupt section (408) (as shown by the key (504)). The VSP attribute (506) and the SS attribute (508) in the valid sections (406) may be used to determine a relationship where the VSP attribute (506) is a function of the SS attribute (508). The SS attribute (508) in the corrupt section (408) may then be input into the relationship to determine a corrected VSP attribute (510) for the corrupt section (408) (as shown by the key (504)).

Further to the example shown in FIG. 5, now assume the attribute is interval velocity. In this case, the VSP data (400) may be separated by P-waves using a wavefield separation method, such as a first break picking method. The VSP interval velocities $v_{VSP}$ for the valid sections (406) may then be determined from the first break VSP data (400) where:

$$v_{VSP} = \frac{d_2 - d_1}{t_{VSP,2} - t_{VSP,1}}. \qquad \text{Equation (1)}$$

Here $d_2$ is a deep seismic receiver depth (320), $d_1$ is a shallow seismic receiver depth (320), $t_{VSP,2}$ is the one-way arrival time (404) of the first breaks to the deep seismic receiver (116) located at $d_2$, and $t_{VSP,1}$ is the one-way arrival time (404) of the first breaks to the shallow seismic receiver (116) located at $d_1$.

Further to this case, the SS data may also be separated for P-waves using a wavefield separation method, such as median filtering. The SS interval velocities $v_{SS}$ for the valid sections (406) may be determined from the P-wave SS data where:

$$v_{SS} = \sqrt{\frac{v_{rms,2}^2 t_2 - v_{rms,1}^2 t_1}{t_2 - t_1}}. \qquad \text{Equation (2)}$$

Here $v_{rms}$ is a root mean square velocity such that $$v_{rms} = \sqrt{\frac{1}{n}\left(v_1^2 + v_2^2 + \cdots + v_n^2\right)}.$$

Specifically, $v_{rms,2}$ is the root mean square velocity for a deep overburden layer (210), cap-rock layer (212), or hydrocarbon reservoir (104) and $v_{rms,1}$ is the root mean square velocity for a shallow overburden layer (210), cap-rock layer (212), or hydrocarbon reservoir (104). Further, $t_2$ is a two-way arrival time of P-waves that reflect at a deep geological discontinuity (112) and $t_1$ is a two-way arrival time of P-waves that reflect at a shallow geological discontinuity (112). Equation (2) is commonly referred to as the Dix equation.

The VSP interval velocities and SS interval velocities in the valid sections (406) may be used to determine the relationship. The SS interval velocities in the corrupt section (408) may then be input into the relationship to determine corrected VSP interval velocities in the corrupt section (408).

Further still to the example shown in FIG. 5, now assume the attribute is attenuation. In this case, VSP attenuation $Q_{vsp}$ and SS attenuation $Q_{ss}$ for the valid sections (406) may each be determined separately using the spectral ratio method. The governing equation used in the spectral ratio method may be:

$$\frac{A_x}{A_0} = GRe^{\frac{-\pi f(t_x - t_0)}{Q}}. \qquad \text{Equation (3)}$$

Here $A_x$ is the amplitude at a deep seismic receiver depth (320), $A_0$ is the amplitude at a shallow seismic receiver depth (320), G is a geometrical spreading correction, R is a reflectivity coefficient, f is the frequency bandwidth, $t_x$ is the initial time of the seismic trace (402) at the deep seismic receiver depth (320), $t_0$ is the initial time of the seismic trace (402) at the shallow seismic receiver depth (320), and Q is attenuation, which may be $Q_{vsp}$ or $Q_{ss}$.

The VSP attenuation and SS attenuations in the valid sections (406) may be used to determine the relationship. The SS attenuations in the corrupt section (408) may then be input into the relationship to determine corrected VSP attenuations in the corrupt section (408). A person of ordinary skill in the art will appreciate the numerous attributes and methods to determine such attributes that may be used to determine one or more relationships.

Figure 6:
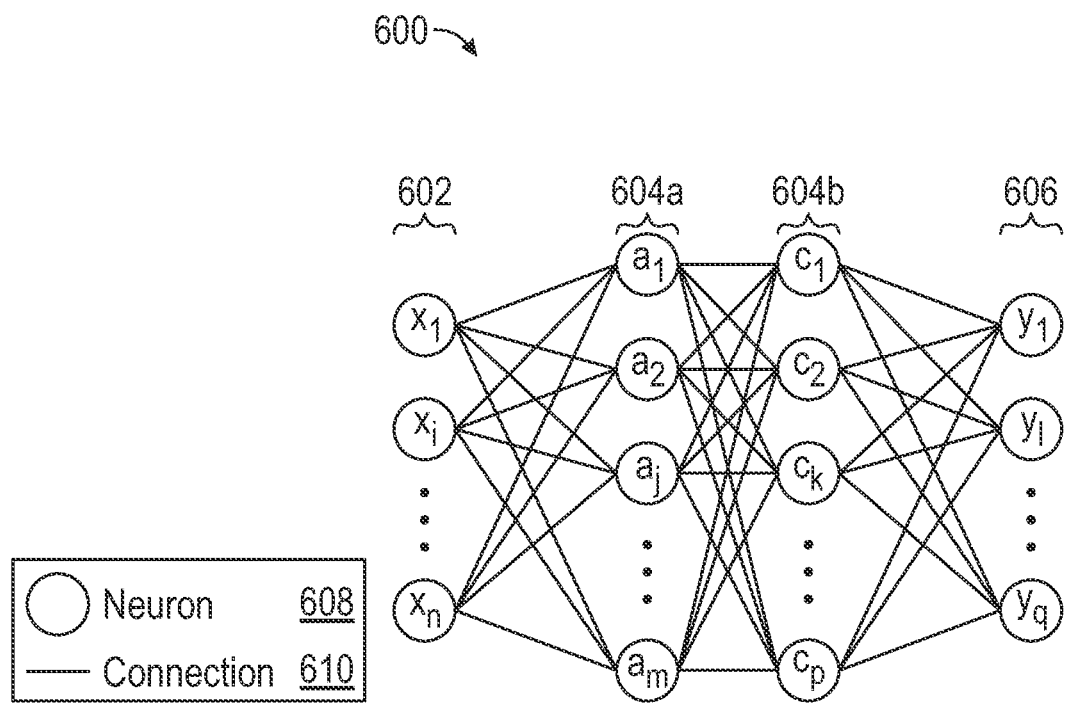
FIG. 6 illustrates a neural network in accordance with one or more embodiments.

Following determination of one or more corrected VSP attributes within the corrupt section (408), one or more "corrected VSP spectra" may be determined using one or more corrected VSP attributes and a neural network. FIG. 6 illustrates a neural network (600) in accordance with one or more embodiments. A neural network (600) uses a series of mathematical operations to make predictions based on observations. A neural network (600) may include an input layer (602), one or more hidden layers (604a-b), and an output layer (606). The input layer (602) may receive observed data and the output layer (606) may present predicted data. The neural network (600) in FIG. 6 may be further described as a deep neural network (600) because multiple hidden layers (604a-b) exist. Further still, FIG. 6 may illustrate a standard feedforward deep neural network (600).

Each layer within a neural network (600) may represent an array. Further, each node or artificial neuron (608; hereinafter "neuron") within a layer may represent an element within the array. A neuron (608) is loosely based on a biological neuron of the human brain. In FIG. 6, each neuron (608) within the input layer (602) may represent the element $x_i$ within the array x, each neuron (608) within the first hidden layer (604a) may represent the element $a_j$ within the array a, each neuron (608) within the second hidden layer (604b) may represent the element $c_k$ within the array c, and each neuron (608) within the output layer (606) may represent the element $y_l$ within the array y. Further to FIG. 6, each array is depicted as a one-dimensional array or vector. In other embodiments, each array may be any dimension.

One or more neurons (608) in one layer may be connected to one or more neurons (608) in neighboring layers through edges or connections (610). A connection (610) is loosely based on a synapse of the human brain. In some embodiments, a connection (610) may have a weight associated to it. For example, assume the input layer (602) and first hidden layer (604a) are "fully connected" or "densely connected." In other words, assume all neurons (608) within the input layer (602) are connected to all neurons (608) within the first hidden layer (604a). Then, the weights for the connections (610) between the input layer (602) and the first hidden layer (604a) may make up an array of weights $w^{(1)}$ with elements $w_{ij}$ where:

$$w^{(1)} = \begin{bmatrix} w_{11} & w_{12} & w_{1j} & \ldots & w_{1m} \\ w_{i1} & w_{i2} & w_{ij} & \ldots & w_{im} \\ \ldots & \ldots & \ldots & \ldots & \ldots \\ w_{n1} & w_{n2} & w_{nj} & \ldots & w_{nm} \end{bmatrix}.$$ Equation (4)

In Equation (4), n is the total number of elements within the array x or the total number of neurons (608) within the input layer (602). Further, m is the total number of elements within the array a or the total number of neurons (608) within the first hidden layer (604a). The elements $w_{ij}$ in each column of $w^{(1)}$ are the weights associated with the connections (610) between each of the elements $x_i$ in the array x that connect to the same element $a_j$ in the array a.

The value of each element $a_j$ in the array a for the first hidden layer (604a) may be determined by:

$a_j = g_j(b_j + \Sigma_i x_i s_{ij})$  Equation (5)

In Equation (5), the elements $b_j$ of array b represent biases and the elements $g_j$ of array g represent activation functions. In some implementations, the biases may be incorporated into the array of weights such that Equation (5) may be written as $a_j 32\ g_j(\Sigma_i x_i w_{ij})$. Each weight $w_{ij}$ within the array of weights $w^{(1)}$ may amplify or reduce the significance of each element $x_i$ relative to each element $a_j$. Activation functions $g_j$ may include, without limitation, the linear function $g_j(x)=x$, the sigmoid function $$g_j(x) = \frac{1}{1+e^{-x}},$$

the rectified linear unit (ReLU) function $g_j(x)=\max(0, x)$, and the scaled exponential linear unit (SeLU) function $g_j(x)=\lambda x$ if $x \geq 0$ and $g_j(x)=\lambda a(e^x-1)$ if $x<0$, where $\lambda$ and a are constants. A person of ordinary skill in the art will appreciate that other activation functions may also be used.

The connections (610) between the first hidden layer (604a) and the second hidden layer (604b) may make up another array of weights $w^{(2)}$ with elements $w_{jk}$. Equation (5) may be modified to determine the elements $c_k$ of array c such that $c_k=g_k(b_k+\Sigma_j a_j w_{jk})$. This process may be repeated until the elements $y_l$ within the array y are determined for the output layer (606). In summary, FIG. 6 may illustrate a standard feedforward deep neural network (600) that uses the mathematical operation of matrix multiplication, as presented in Equation (5), to predict the array y represented by the output layer (606) from the observed array x represented by the input layer (602). Note that FIG. 6 depicts a highly simplified and generic neural network (600).

Mathematical operations other than or in addition to matrix multiplication may be used within the architecture of a neural network (600). Other mathematical operations may include, but are not limited to convolution, concatenation, activation, pooling, batch normalization, and dropout.

Another type of neural network (600) that uses the mathematical operation of convolution, in additional to other mathematical operations, is a convolutional neural network (CNN). A CNN may be well suited when the array x represented by the input layer (602) is a one-, two-, or three-dimensional array where spatial dependencies exist. For example, in some embodiments, the array x may be one two-dimensional image, two two-dimensional images where each image presents a unique resolution, or three two-dimensional images where each image presents a red-green-blue (RGB) channel. Each image may be referred to as a "head." For example, a head may be an SS attribute, a VSP attribute, or a corrected VSP attribute.

Figure 7A:
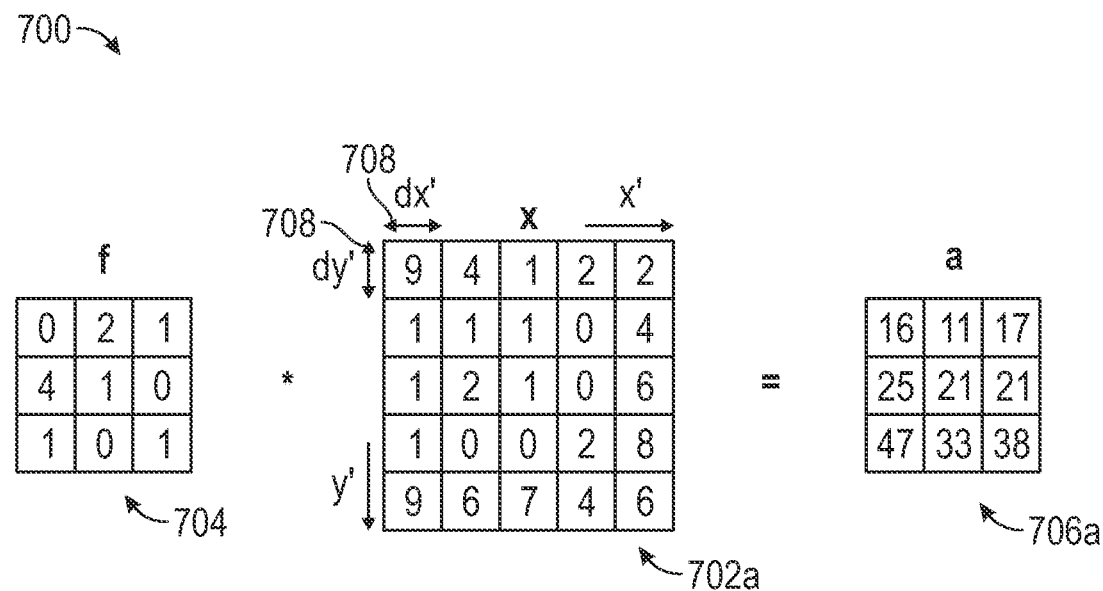
FIG. 7A illustrates convolution in accordance with one or more embodiments.

FIG. 7A illustrates convolution (700) in accordance with one or more embodiments. In FIG. 7A, a square 3×3 convolution filter or kernel f (704) is convolved with a two-dimensional array x (702a) to determine the array a (706a) where:

$a(x',y')=f*x(x',y')=\Sigma_{dx'=-a}{}^a\Sigma_{dy'=-}{}^b f(dx',dy')x(x'-dx',y'-dy').$  Equation (6)

Here, the kernel f (704) contains the weights. The weights take values between 1 and 4 in FIG. 7A. The operator "*" denotes convolution (700). Pairs (x', y') refer to the position within the array x (702a). The step size dx' and dy' represent the stride (708), which both take a value of 1 in FIG. 7A. The stride (708) is a hyperparameter of a CNN. In other embodiments, the array x (702a) may be any dimensionality, the kernel f (704) may be rectangular and a different size, and the stride (708) may be an integer other than 1. The resulting array a (706a) is denoted a "feature map" or "activation map."

To convolve the kernel f (704) with the array x (702a) using a stride (708) of 1, imagine the kernel f (704) sliding or translating along the array x (702a) in increments or strides (708) of 1. A stride (708) of 1 for dx' is one column within the array x (702a) and a stride of 1 for dy' is one row within the array x (702a). For each translation of f along x, a linear combination of f and the portion of x that f is overlapping with determines one element of the array a (706a) as described mathematically by Equation (6). For example, the first element of the array a (706a; i.e., 16) is determined using the kernel f (704) and the first sub-array of the array x (702a) that f overlaps with (i.e., [9 4 1; 1 1 1; 1 2 1]) such that:

$$(9\cdot 0)+(4\cdot 2)+(1\cdot 1)+(1\cdot 4)+(1\cdot 1)+(1\cdot 0)+(1\cdot 1)+(2\cdot 0)+(1\cdot 1)\\=16.$$

The kernel f (704) then translates to the right by a stride (708) of 1 in the x' direction and the same calculation is performed to determine the second element of the array a (706a; i.e., 11) where:

$$(4\cdot 0)+(1\cdot 2)+(2\cdot 1)+(1\cdot 4)+(1\cdot 1)+(0\cdot 0)+(2\cdot 1)+(1\cdot 0)+(0\cdot 1)\\=11.$$

The kernel f (704) may continue to slide by one column or one row at a time until all elements of the array a (706a) are determined.

Figures 7B, 7C:
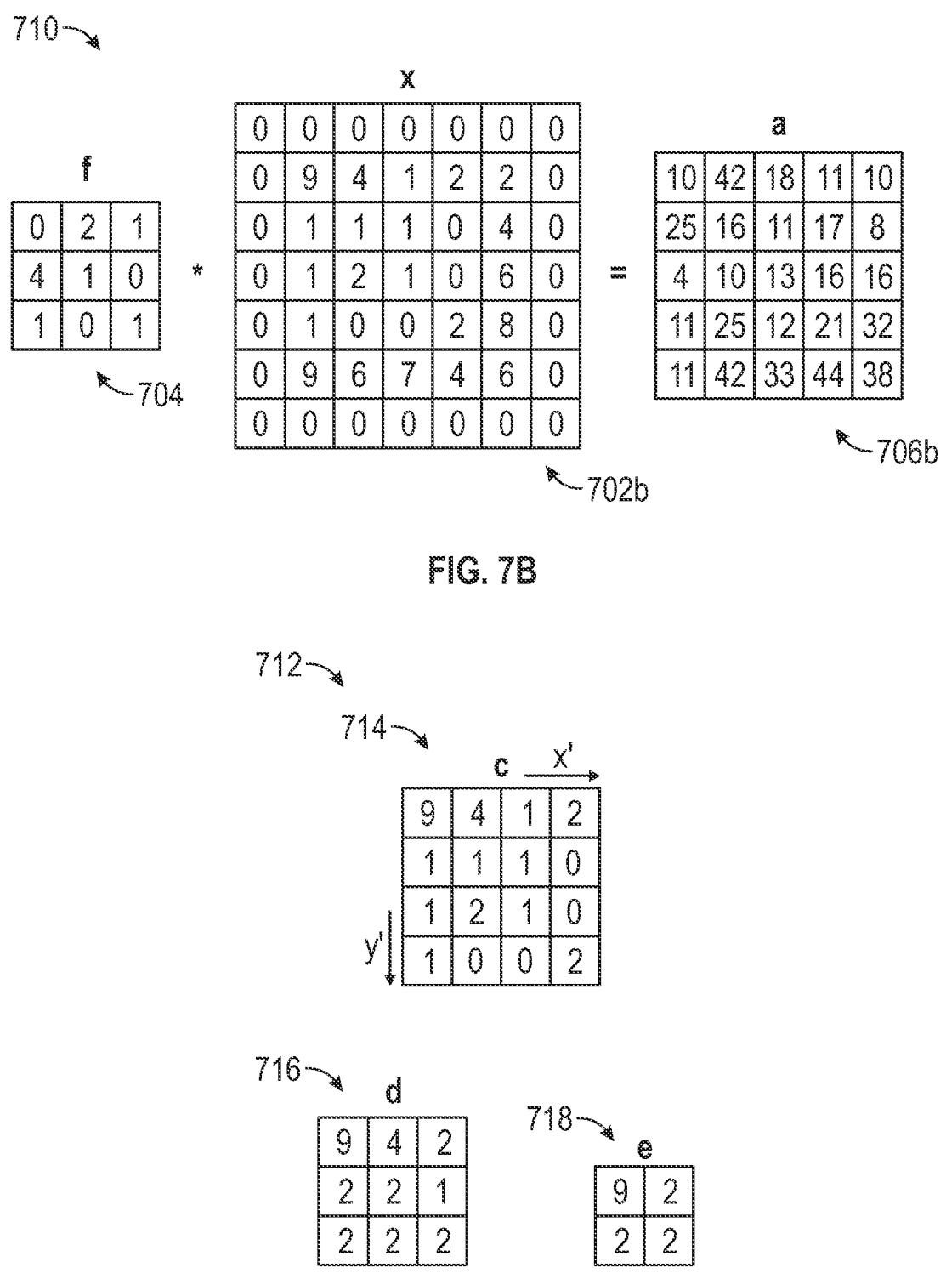

As seen in FIG. 7A, convolution (700) inherently down samples. To avoid down sampling, zero padding may be implemented around the array x (702a) prior to convolution (700). FIG. 7B illustrates convolution with zero padding (710) in accordance with one or more embodiments. The array x (702a) from FIG. 7A is now surrounded by zeros to determine a padded array x (702b). Now the first sub-array of the padded array x (702b) that the kernel f (704) overlaps with includes some zeros. Following convolution with zero padding (710), the padded array a (706b) maintains the size of the array x (702a) shown in FIG. 7A. Note that padding is another hyperparameter within a CNN.

In practice, a CNN will convolve one or more kernels (704) with one section of an array x, one or more kernels (704) with another section of the array x, etcetera. This idea is known as "local connectivity" where each section of the array x that one or more kernels (704) is convolved with is a "receptive field." If K kernels (704) are convolved with each of L sections of the array x, K·L activation maps are determined. If more than one activation map is determined, concatenation or stacking of all activation maps may be performed to determine a complete output. The size, types, and number of kernels (704) are other hyperparameters within a CNN.

Another mathematical operation that may be used within a CNN is activation. In some embodiments, activation may be performed following convolution (700). Activation may apply an activation function g, such as SeLU, to each element within the array a. No weights are associated with activation in reference to a CNN.

Yet another mathematical operation that may be used within a CNN is pooling. Pooling is another hyperparameter of a CNN. Pooling may be used to reduce the size of an array. Average pooling and maximum pooling are common pooling types.

FIG. 7C illustrates pooling (712) the array c (714) in accordance with one or more embodiments. For example, the array d (716) is determined from the array c (714) by applying maximum pooling (712) with a 2×2 pool size and a stride (708) of 1. The first element in the array d (716; i.e., 9) is the maximum element within the first 2×2 sub-array of c (714; i.e., [9 4; 1 1]). The second element in the array d (i.e., 4) is the maximum element within the second 2×2 sub-array of c following sliding the 2×2 pool size to the right by a stride of 1 within the array c (714; i.e., [4 1; 1 1]). Similar to convolution (700), the 2×2 pool size continues to slide by a stride (708) of 1 in either the x' direction or the y' direction until all elements in array d (716) are determined. The array c (714) has now been reduced from a 4×4 array to a 3×3 array or array d (716).

Continuing with FIG. 7C, the array e (718) is determined from the array c (714) by applying maximum pooling (712) with a 2×2 pool size and a stride (708) of 2. The first element in the array e (i.e., 9) is determined in the same way as the first element in array d (716). However, because the stride (708) is now 2, the second sub-array of c (714) used to determine the second element of e (i.e., 2) is [1 2; 1 0]. The process continues until the array e (718) is fully populated. The array c (714) has now been reduced from a 4×4 array to a 2×2 array or array e (718).

Still other mathematical operations that may be used within a CNN are batch normalization and dropout. Batch normalization may normalize an array such that the elements within the array are between [−1,1]. Whereas dropout is a mathematical operation associated with training a CNN. Training may be defined as the process of determining the values of the weights and bias such that a neural network (600) makes accurate predictions. Training may be performed iteratively, where each iteration is commonly denoted an "epoch." Each epoch may use a subset of the training data and backpropagation. Prior to an epoch, connections (610) will be randomly dropped or removed between two neighboring layers based on a dropout probability p. Backpropagation may then be performed for the epoch. Following backpropagation, the dropped connections (610) are reconnected. Connections (610) may be randomly dropped based on the dropout probability for any number of epochs.

Any of the mathematical operations discussed above (i.e., matrix multiplication, convolution (700), concatenation, activation, pooling (712), batch normalization, and dropout), and others not discussed, may be used in any quantity and any order to build a CNN as long as convolution (700) is used at least once. For example, the architecture of a CNN may be convolution (700), activation, dropout, batch normalization, concatenation, and activation performed in series.

FIG. 8A depicts a CNN (800) during training in accordance with one or more embodiments. The CNN (800) includes the mathematical operation of convolution (700) and may include the mathematical operations of concatenation, activation, pooling (712), batch normalization, and/or dropout.

The training data includes one or more pairs of inputs or heads. Each pair is the same attribute type from the VSP data (400) and the SS data in one or more valid section (406) of the VSP data (400). For example, VSP interval velocities and SS interval velocities in one or more valid sections (406) make up one pair. Further, VSP attenuations and SS attenuations in one or more valid sections (406) make up a second pair. FIG. 8A generically denotes one pair, a VSP attribute (506) and an SS attribute (508), in one or more valid sections (406) that are input into the CNN (800).

The training data further includes one or more VSP spectra (806) for one or more valid sections (406) as CNN outputs. The VSP spectra (806) may include the VSP amplitude spectrum and/or the VSP phase spectrum. A VSP spectrum (806) may be determined from the VSP data (400) using, but not limited to, a short-time discrete Fourier transform, such as a Gabor transform or S transform, the continuous wavelet transform, or the Wigner distribution function.

FIG. 8B depicts the CNN (800) following training in accordance with one or more embodiments. The trained CNN (800) is used predict corrected VSP spectra (808) in one or more corrupt sections (408). Similar to the inputs in the training data, the inputs include one or more pairs of the same attribute type. However, now, each pair is the corrected VSP attribute (510) determined using the relationship and the SS attribute (508) for the corrupt section (408) as depicted in FIG. 8B. One pair may be corrected VSP interval velocities and SS interval velocities for the corrupt section (408). Another pair may be corrected VSP attenuations and SS attenuations for the corrupt section (408).

Figure 9:
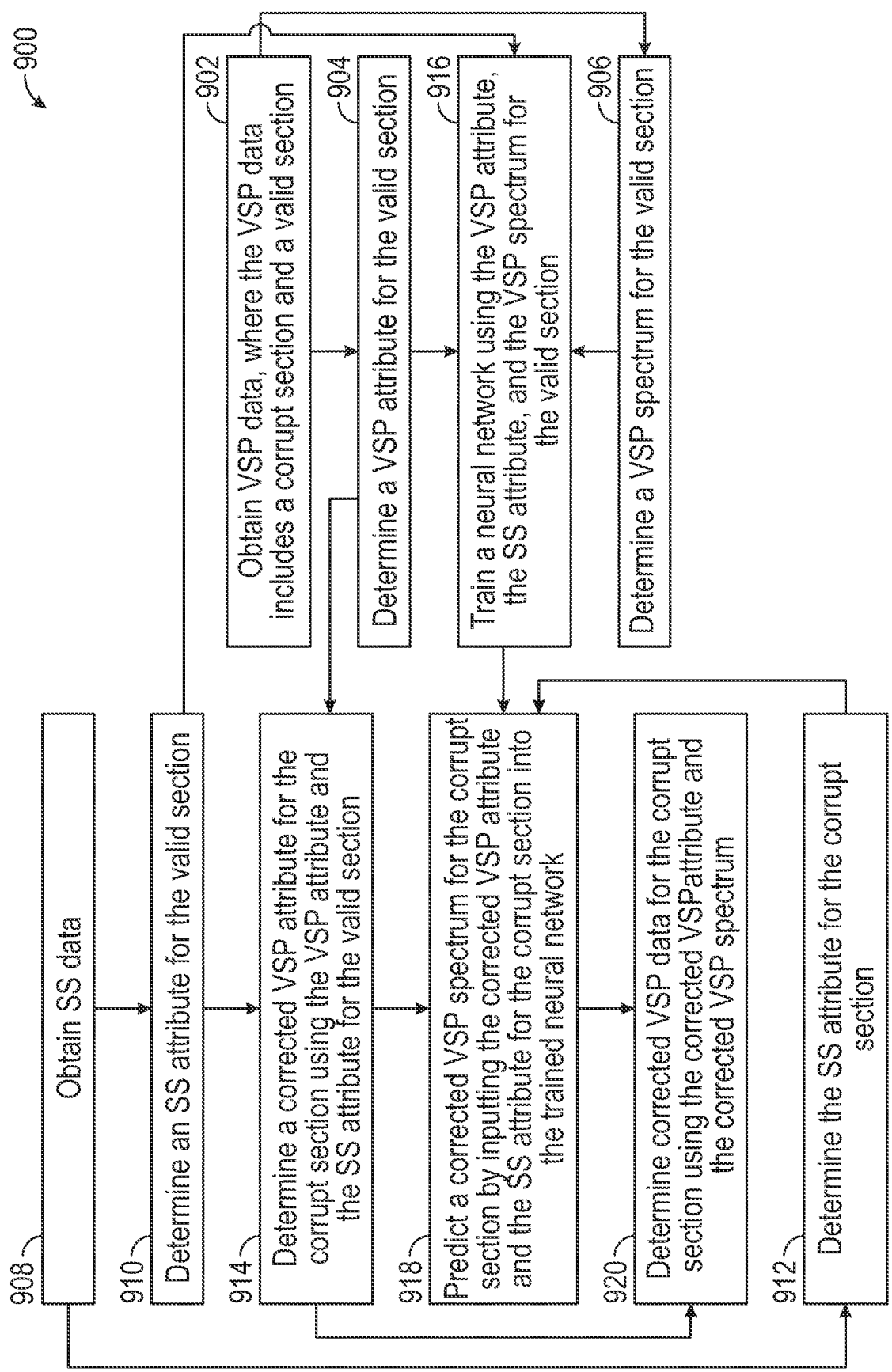
FIG. 9 shows a flowchart in accordance with one or more embodiments.

FIG. 9 describes a method (900) in accordance with one or more embodiments. In step 902, obtain VSP data (400) for a subterranean region of interest (102). The VSP data (400) may be obtained from a VSP survey (300) as described in FIG. 3. The VSP data (400) may contain seismic traces (402) that present a variety of wave types. Further, the VSP data (400) includes artifacts. The artifacts may include noisy, corrupt, anomalous, and/or missing seismic traces (402). The VSP data (400) is separated by artifacts such that a corrupt section (408) contains artifacts and a valid section (406) contains little-to-no artifacts. Separating the VSP data (400) into a corrupt section (408) and a valid section (406) may be done manually, semi-automatically, or automatically.

In step 904, a VSP attribute (506) is determined using the VSP data (400) from the valid section (406). Attribute types may include time, depth, velocity, attenuation, amplitude, frequency, phase, and polarity. In step 906, a VSP spectrum (806) is determined using the VSP data (400) from the valid section (406). The VSP spectrum (806) may be determined from the VSP data (400) using various transforms as previously listed.

In step 908, obtain SS data for the subterranean region of interest (102). The SS data may be obtained from a SS survey (100) as described in FIG. 1. Further, the SS data may contain a variety of wave types and wave directions.

In step 910, an SS attribute (508) is determined using the SS data from the valid section (406). The SS attribute (508) determined is the VSP attribute type determined in step 904. In step 912, the SS attribute (508) is determined using the SS data from the corrupt section (408).

In step 914, a corrected VSP attribute (510) for the corrupt section (408) is determined. The VSP attribute (506) for the valid section (406) determined in step 904 and the SS attribute (508) for the valid section (406) determined in step 910 are used to determine a relationship. The relationship is used to determine the corrected VSP attribute (510) as described in FIG. 5.

In step 916, a neural network (600) is trained. The neural network (600) may be a CNN. Training data inputs include a VSP attribute (506) and SS attribute (508) pair for the valid section (406). Each VSP attribute (506) and SS attribute (508) pair is the same attribute type. Training data outputs include a VSP spectrum (806) for the valid section (406).

In step 918, a corrected VSP spectrum (808) is predicted using the trained neural network (600). Inputs into the trained neural network (600) include the corrected VSP attribute (510) for the corrupt section (408) determined in step 914 and the SS attribute (508) for the corrupt section (408) determined in step 912.

In step 920, corrected VSP data is determined using the corrected VSP attribute (510) determined in step 914 and the corrected VSP spectrum (808) determined in step 918.

Figure 10:
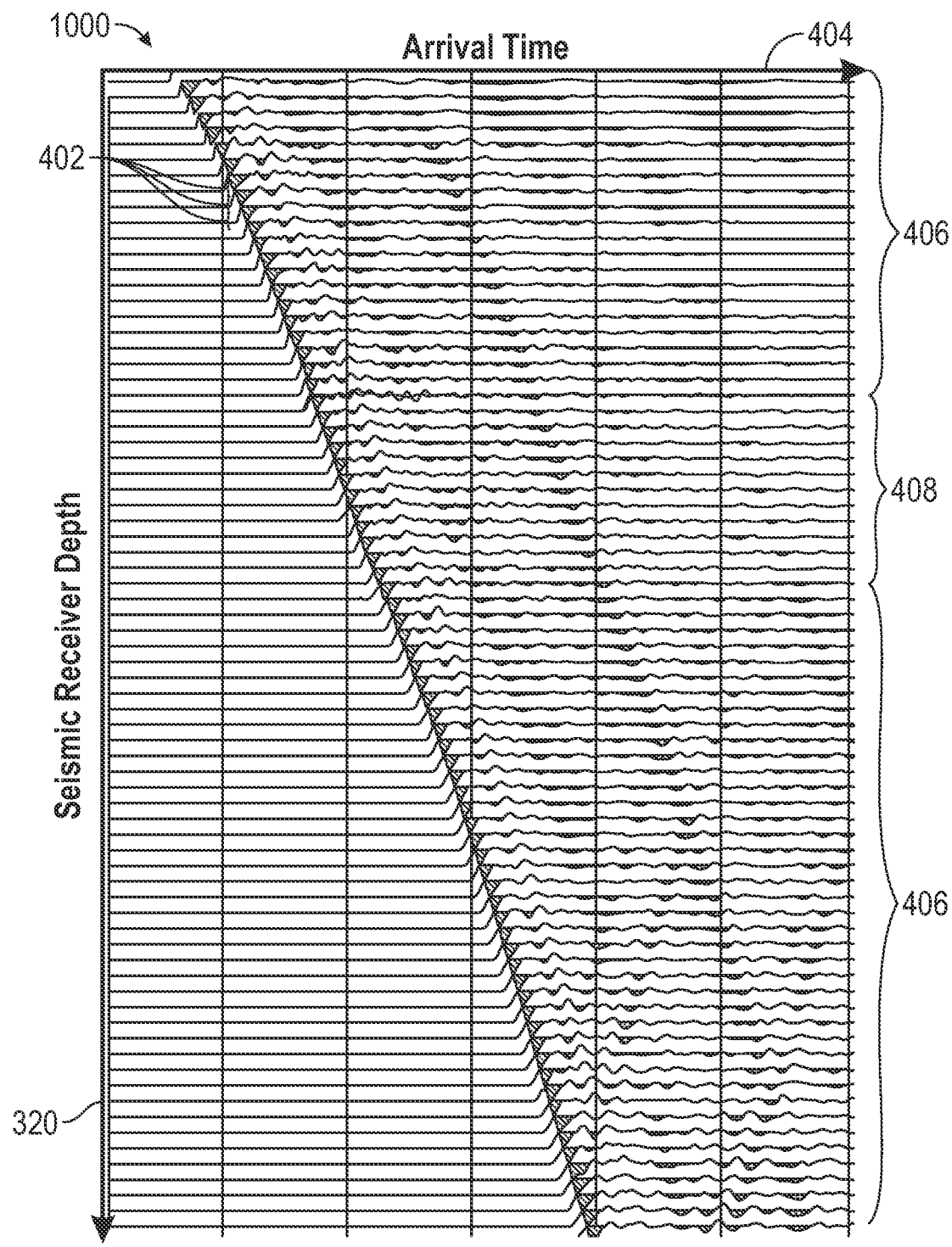
FIG. 10 shows corrected vertical seismic profiling data in accordance with one or more embodiments.

FIG. 10 displays corrected VSP data (1000) in accordance with one or more embodiments. The seismic traces (402) in the valid sections (406) of the corrected VSP data (1000) remain unchanged relative to valid sections (406) in the VSP data (400) in FIG. 4. The seismic traces (402) in the corrupt section (408) now present reasonable seismic traces (402). In other words, the seismic traces (402) in the corrupt section (408) present seismic traces (402) that present reasonable attributes, such as velocity, attenuation, amplitude, phase, and frequency.

The corrected VSP data (1000) may be used to determine a velocity model. A velocity model may be determined using the known seismic receiver depths (320) during a VSP survey (300) and the vertical two-way travel times determined from the corrected VSP data (1000). The velocity model may be used to convert the SS data from a time domain to a depth domain. The depth-domain SS data may then be used to further characterize a hydrocarbon reservoir (104) or to locate a hydrocarbon reservoir (104) within the subterranean region of interest (102).

Figure 11:
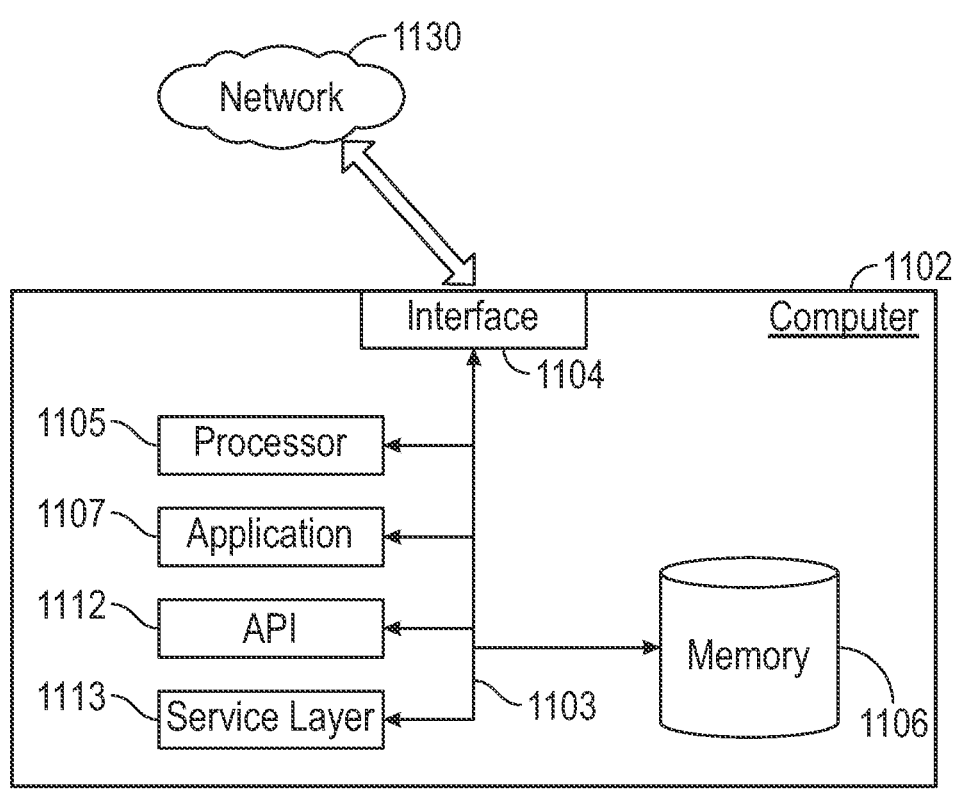
FIG. 11 depicts a computer system in accordance with one or more embodiments.

FIG. 11 depicts a block diagram of a generic computer system (1102; hereinafter also "computer") in accordance with one or more embodiments. One computer (1102) may be a generic computer (1102) with a generic computer processor (1105). The generic computer (1102) may be used to train the neural network (600), make predictions using the neural network (600), and determine corrected VSP data (1000). Further, the generic computer (1102) may include a well planning system stored in a memory (1106). Another computer (1102) may be specifically configured for seismic processing and denoted a seismic processing system. The seismic processing system may receive VSP data (400) and SS data and determine a VSP attribute (506), a VSP spectrum (806), an SS attribute (508), and a corrected VSP attribute (510). Yet another computer (1102) may be specifically configured for seismic interpretation and denoted a seismic interpretation workstation. The seismic interpretation workstation may be used to locate the manifestation of a hydrocarbon reservoir (104) within the depth-domain SS data. Hereinafter, the computer (1102) illustrated in FIG. 11 may be a generic computer (1102) with a generic processor (1105), a seismic processing system, or a seismic interpretation workstation. Each component of a computer (1102) is described below and further detailed depending on the specific configuration of interest.

Returning to FIG. 11, the illustrated computer (1102) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (1102) may include a computer that includes an input device, such as a keypad, keyboard, touch screen, or other device that can accept user information, and an output device that conveys information associated with the operation of the computer (1102), including digital data, visual, or audio information (or a combination of information), or a graphical user interface. Specifically, a seismic interpretation workstation may include a robust graphics card for the detailed rendering of the depth-domain SS data that may be displayed and manipulated in a virtual reality system using 3D goggles, a mouse, or a wand.

The computer (1102) can serve in a role as a client, network component, a server, a database or other persistency, or any other component (or a combination of roles) of a computer system (1102) as required for generic processing, seismic processing, and seismic interpretation. The illustrated computer (1102) is communicably coupled with a network (1130). For example, a generic computer (1102), seismic processing system, and seismic interpretation workstation may be communicably coupled using a network (1130). In some implementations, one or more components of the computer (1102) may be configured to operate within environments, including cloud-computing-based, local, global, or other environment (or a combination of environments).

At a high level, the computer (1102) is an electronic computing device operable to receive, transmit, process, store, or manage data and information associated with generic processing, seismic processing, and seismic interpretation. According to some implementations, the computer (1102) may also include or be communicably coupled with an application server, e-mail server, web server, caching server, streaming data server, business intelligence (BI) server, or other server (or a combination of servers).

Because generic processing, seismic processing, and seismic interpretation may not be sequential, each computer system (1102) can receive requests over network (1130) from any other computer (1102) or another client application and respond to the received requests by processing the requests appropriately. In addition, requests may also be sent to the computer (1102) from internal users (for example, from a command console or by other appropriate access method), external or third-parties, other automated applications, as well as any other appropriate entities, individuals, systems, or computers.

Each of the components of the computer (1102) can communicate using a system bus (1103). In some implementations, any or all of the components of the computer (1102), both hardware or software (or a combination of hardware and software), may interface with each other or the interface (1104) (or a combination of both) over the system bus (1103) using an application programming interface (API) (1112) or a service layer (1113) (or a combination of the API (1112) and service layer (1113). The API (1112) may include specifications for routines, data structures, and object classes. The API (1112) may be either computer-language independent or dependent and refer to a complete interface, a single function, or even a set of APIs. The service layer (1113) provides software services to the computer (1102) or other components (whether or not illustrated) that are communicably coupled to the computer (1102). The functionality of the computer (1102) may be accessible for all service consumers using this service layer. Software services, such as those provided by the service layer (1113), provide reusable, defined business functionalities through a defined interface. For example, the interface may be software written in JAVA, C++, or other suitable language providing data in extensible markup language (XML) format or another suitable format. While illustrated as an integrated component of the computer (1102), alternative implementations may illustrate the API (1112) or the service layer (1113) as stand-alone components in relation to other components of the computer (1102) or other components (whether or not illustrated) that are communicably coupled to the computer (1102). Moreover, any or all parts of the API (1112) or the service layer (1113) may be implemented as child or sub-modules of another software module, enterprise application, or hardware module without departing from the scope of this disclosure.

The computer (1102) includes an interface (1104). Although illustrated as a single interface (1104) in FIG. 11, two or more interfaces (1104) may be used according to particular needs, desires, or particular implementations of the computer (1102). The interface (1104) is used by the computer (1102) for communicating with other systems in a distributed environment that are connected to the network (1130). Generally, the interface (1104) includes logic encoded in software or hardware (or a combination of software and hardware) and operable to communicate with the network (1130). More specifically, the interface (1104) may include software supporting one or more communication protocols, such as the Wellsite Information Transfer Specification (WITS) protocol, associated with communications such that the network (1130) or interface's hardware is operable to communicate physical signals within and outside of the illustrated computer (1102).

The computer (1102) includes at least one computer processor (1105). Generally, the computer processor (1105) executes instructions and manipulates data to perform the operations of the computer (1102) and any algorithms, methods, functions, processes, flows, and procedures as described in the instant disclosure. A computer processor (1105) may be a central processing unit (CPU) or a graphics processing unit (GPU). The VSP data (400) and SS data may be hundreds of terabytes in size. To efficiently process the VSP data (400) and SS data, a seismic processing system may consist of an array of CPUs with one or more subarrays of GPUs attached to each CPU. Further, tape readers or high-capacity hard drives may be connected to the CPUs using wide-band system buses (1103).

The computer (1102) also includes a memory (1106) that stores a well planning system and other data for the computer (1102) or other components (or a combination of both) that can be connected to the network (1130). For example, memory (1106) can be a database storing data consistent with this disclosure. Although illustrated as a single memory (1106) in FIG. 11, two or more memories may be used according to particular needs, desires, or particular implementations of the computer (1102) and the described functionality. While memory (1106) is illustrated as an integral component of the computer (1102), in alternative implementations, memory (1106) can be external to the computer (1102).

The application (1107) is an algorithmic software engine providing functionality according to particular needs, desires, or particular implementations of the computer (1102), particularly with respect to functionality described in this disclosure. For example, application (1107) can serve as one or more components, modules, applications, etc. Further, although illustrated as a single application (1107), the application (1107) may be implemented as multiple applications (1107) on the computer (1102). In addition, although illustrated as integral to the computer (1102), in alternative implementations, the application (1107) can be external to the computer (1102).

There may be any number of computers (1102) associated with, or external to, a generic computer (1102), a seismic processing system, and a seismic interpretation workstation, wherein each computer (1102) communicates over network (1130). Further, the term "client," "user," and other appropriate terminology may be used interchangeably as appropriate without departing from the scope of this disclosure.

Moreover, this disclosure contemplates that many users may use one computer (1102), or that one user may use multiple computers (1102).

Figure 12:
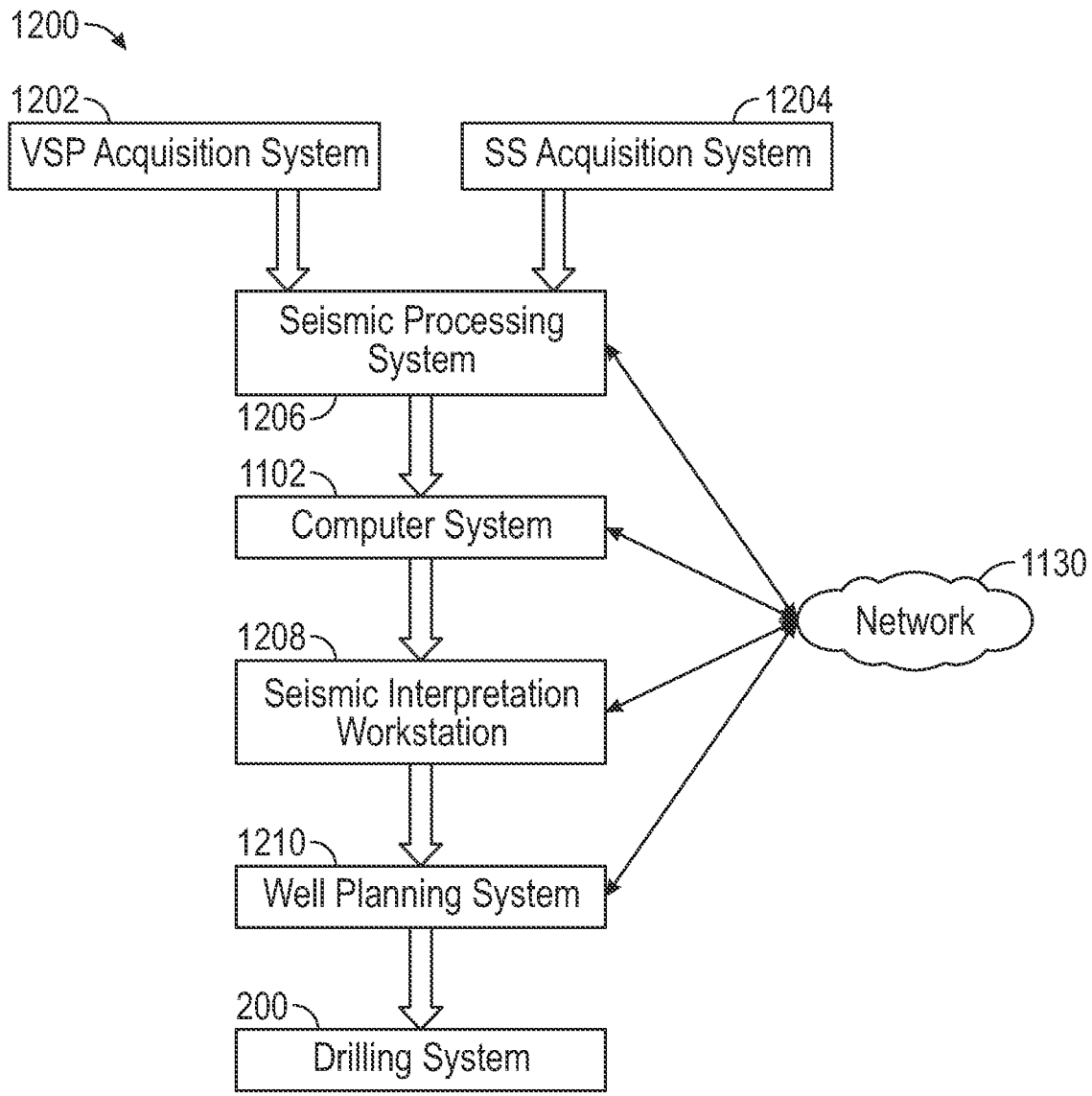
FIG. 12 illustrates a system in accordance with one or more embodiments.

FIG. 12 illustrates a series of systems (1200) in accordance with one or more embodiments. Each system may be coupled to one or more other systems within the series of systems (1200). The VSP acquisition system (1202) obtains the VSP data (400) as previous described in FIG. 3. The SS acquisition system (1204) obtains the SS data as previously described in FIG. 1.

Due to their size, the VSP data (400) and SS data may be physically transferred to the seismic processing system (1206) in the form of tape readers or high-capacity hard drives. The seismic processing system (1206) receives the VSP data (400) and SS data. The seismic processing system (1206) determines the VSP attribute (506), VSP spectrum (806), SS attribute (508), and corrected VSP attribute (510) using the VSP data (400) and the SS data.

The VSP attribute (506), VSP spectrum (806), SS attribute (508), and corrected VSP attribute (510) may be transferred to the computer system (1102) via the network (1130). The computer system (1102), which includes the computer processor (1105), trains the neural network (600), makes predictions using the neural network (600), and determines the corrected VSP data (1000).

The corrected VSP data (1000) may be transferred back to a seismic processing system (1206) via a network (1130). The seismic processing system (1206) may determine a velocity model from the corrected VSP data (1000) and transform the SS data from the time domain to the depth domain using the velocity model.

The depth-domain SS data may be transferred to a seismic interpretation workstation (1208). The seismic interpretation workstation (1208) may be used to locate the manifestation of a hydrocarbon reservoir (104) and other subterranean features within the depth-domain SS data.

Knowledge of the manifestation of the hydrocarbon reservoir (104) and other subterranean features may then be transferred to a well planning system (1210). The well planning system (1210) may be located on the memory (1106) within the computer system (1102). The well planning system (1210) uses the knowledge of the manifestation of the hydrocarbon reservoir (104) and other subterranean features to define a well path within the subterranean region of interest (102).

The well path may be transferred to the drilling system (200) described in FIG. 2. The drilling system (200) may drill the well (122) along the well path to access and produce the hydrocarbon reservoir (104) to the surface of the earth (124).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A method comprising:
   obtaining vertical seismic profiling (VSP) data for a subterranean region of interest,
      wherein the VSP data comprises a plurality of VSP traces, and
      wherein each of the plurality of VSP traces comprises a plurality of VSP time samples;
   separating the VSP data into a corrupt VSP section and a valid VSP section;
   obtaining surface seismic (SS) data for the subterranean region of interest,
      wherein the SS data comprises a plurality of SS traces, and
      wherein each of the plurality of SS traces comprises a plurality of SS time samples;
   separating the SS data into a first valid SS section corresponding to the corrupt VSP section and a second valid SS section corresponding to the valid VSP section;
   for each of the plurality of VSP time samples among each of the plurality of VSP traces within the valid VSP section, determining a VSP attribute and a VSP spectrum using the VSP data;
   for each of the plurality of SS time samples among each of the plurality of SS traces, determining an SS attribute using the SS data;
   for each of the plurality of VSP time samples among each of the plurality of VSP traces within the corrupt VSP section, determining a corrected VSP attribute using the VSP attribute and the SS attribute;
   training a neural network using the VSP attribute, the SS attribute associated with the second valid SS section, and the VSP spectrum,
      wherein the neural network is trained to predict a corrected VSP spectrum associated with the corrupt VSP section based on the corrected VSP attribute and the SS attribute associated with the first valid SS section;
   predicting the corrected VSP spectrum associated with the corrupt VSP section by inputting the corrected VSP attribute and the SS attribute associated with the first valid SS section into the trained neural network;
   determining corrected VSP data within the corrupt VSP section using the corrected VSP attribute and the corrected VSP spectrum;
   determining a velocity model using the corrected VSP data;
   transforming the SS data from a time domain to a depth domain using the velocity model; and
   locating a hydrocarbon reservoir using the SS data in the depth domain.

2. The method of claim 1, further comprising:
   planning a well path; and
   drilling a well along the well path to produce the hydrocarbon reservoir.

3. The method of claim 1, wherein the VSP data within the corrupt VSP section comprises artifacts.

4. The method of claim 1, wherein the VSP attribute comprises a VSP interval velocity.

5. The method of claim 1, wherein the VSP spectrum comprises a phase spectrum.

6. The method of claim 1, wherein obtaining the VSP data comprises a wavefield separation method.

7. The method of claim 1, wherein determining the corrected VSP attribute comprises:
   determining a relationship between the VSP attribute associated with the valid VSP section and the SS attribute associated with the second valid SS section; and
   determining the corrected VSP attribute associated with the corrupt VSP section using the relationship.

8. The method of claim 1, wherein the neural network comprises a convolutional neural network.

9. The method of claim 8, wherein an architecture of the convolutional neural network comprises convolution, activation, dropout, and batch normalization performed in series.

10. A system comprising:
a vertical seismic profiling (VSP) acquisition system configured to obtain VSP data for a subterranean region of interest,
  wherein the VSP data comprises a plurality of VSP traces, and
  wherein each of the plurality of VSP traces comprises a plurality of VSP time samples;
a surface seismic (SS) acquisition system configured to obtain SS data for the subterranean region of interest,
  wherein the SS data comprises a plurality of SS traces, and
  wherein each of the plurality of SS traces comprises a plurality of SS time samples;
a seismic processing system configured to:
  receive, from the VSP acquisition system, the VSP data;
  separating the VSP data into a corrupt VSP section and a valid VSP section,
  receive, from the SS acquisition system, the SS data;
  separating the SS data into a first valid SS section corresponding to the corrupt VSP section and a second valid SS section corresponding to the valid VSP section;
  for each of the plurality of VSP time samples among each of the plurality of VSP traces within the valid VSP section, determine a VSP attribute and a VSP spectrum using the VSP data,
  for each of the plurality of SS time samples among each of the plurality of SS traces, determine an SS attribute using the SS data, and
  for each of the plurality of VSP time samples among each of the plurality of VSP traces within the corrupt VSP section, determine a corrected VSP attribute using the VSP attribute and the SS attribute; and
a computer processor configured to:
  train a neural network using the VSP attribute, the SS attribute associated with the second valid SS section, and the VSP spectrum,
    wherein the neural network is trained to predict a corrected VSP spectrum associated with the corrupt VSP section based on the corrected VSP attribute and the SS attribute associated with the first valid SS section,
  predict the corrected VSP spectrum associated with the corrupt VSP section by inputting the corrected VSP attribute and the SS attribute associated with the first valid SS section into the trained neural network,
  determine corrected VSP data within the corrupt VSP section using the corrected VSP attribute and the corrected VSP spectrum,
  determine a velocity model using the corrected VSP data, and
  transform the SS data from a time domain to a depth domain using the velocity model; and
a seismic interpretation workstation configured to locate a hydrocarbon reservoir using the SS data in the depth domain.

11. The system of claim 10, further comprising:
a well planning system configured to define a well path that penetrates the hydrocarbon reservoir; and
a drilling system configured to drill a well along the well path.

12. The system of claim 10, wherein the VSP data within the corrupt VSP section comprises artifacts.

13. The system of claim 10, wherein the VSP attribute comprises a VSP interval velocity.

14. The system of claim 10, wherein the VSP spectrum comprises a phase spectrum.

15. The system of claim 10, wherein to obtain the VSP data comprises a wavefield separation method.

16. The system of claim 10, wherein to determine the corrected VSP attribute comprises:
to determine a relationship between the VSP attribute associated with the valid VSP section and the SS attribute associated with the second valid SS section; and
to determine the corrected VSP attribute associated with the corrupt VSP section using the relationship.

17. The system of claim 10, wherein the neural network comprises a convolutional neural network.

18. The system of claim 17, wherein an architecture of the convolutional neural network comprises convolution, activation, dropout, and batch normalization performed in series.

* * * * *